(12) United States Patent
Raveh et al.

(10) Patent No.: US 11,942,989 B2
(45) Date of Patent: Mar. 26, 2024

(54) COMMUNICATION METHODS AND SYSTEMS

(71) Applicant: GOOGLE LLC, Mountain View, CA (US)

(72) Inventors: Ido Raveh, Waterloo (CA); Stuart James Myron Nicholson, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 443 days.

(21) Appl. No.: 17/219,017

(22) Filed: Mar. 31, 2021

(65) Prior Publication Data

US 2022/0271836 A1     Aug. 25, 2022

Related U.S. Application Data

(60) Provisional application No. 63/003,553, filed on Apr. 1, 2020.

(51) Int. Cl.
*H04B 10/00* (2013.01)
*G02B 27/01* (2006.01)
*H04B 10/114* (2013.01)
*H04W 76/10* (2018.01)

(52) U.S. Cl.
CPC ......... *H04B 10/1143* (2013.01); *G02B 27/01* (2013.01); *H04W 76/10* (2018.02)

(58) Field of Classification Search
CPC ... H04B 10/11; H04B 10/112; H04B 10/1123; H04B 10/114; H04B 10/1143; H04B 10/1149; H04B 10/116; H04B 10/40; H04B 10/2507; G02B 27/01; G02B 27/0176; G02B 27/017; G02B 27/0172; G06F 1/163
USPC ....... 398/118, 119, 127, 128, 130, 129, 131, 398/135, 136, 158, 159, 115, 172, 164, 398/33; 345/7, 8, 156, 169, 173
See application file for complete search history.

(56) References Cited

U.S. PATENT DOCUMENTS

| | | | |
|---|---|---|---|
| 8,184,983 B1 * | 5/2012 | Ho | H04B 10/1143 345/8 |
| 10,531,237 B2 * | 1/2020 | Meredith | H04W 4/02 |
| 2016/0150350 A1 * | 5/2016 | Ingale | H04W 4/38 370/255 |
| 2022/0158027 A1 * | 5/2022 | Khatibzadeh | H04B 10/40 |

\* cited by examiner

*Primary Examiner* — Hanh Phan

(57) ABSTRACT

There is provided a method including receiving an incoming ID at a first wearable heads-up display (WHUD), which incoming ID is associated with a communicant device. The method also includes sending match data from the first WHUD to a match engine. The match data includes a first WHUD ID and the incoming ID. Moreover, the method includes receiving a match indicator at the first WHUD from the match engine. The match indicator is to indicate a match event between the first WHUD and the communicant device based on the match data. Furthermore, the method includes effecting communication between the first WHUD and the communicant device comprising at least one of sending a message from the first WHUD to the communicant device and receiving at the first WHUD a corresponding message from the communicant device. The first WHUD, and a method of operating the match engine are also described.

20 Claims, 7 Drawing Sheets

COMMUNICATION METHODS AND SYSTEMS

CROSS-REFERENCE TO RELATED APPLICATION

The present application claims priority to U.S. Provisional Patent Application Ser. No. 63/003,553, entitled "COMMUNICATION METHODS AND SYSTEMS" and filed on Apr. 1, 2020, the entirety of which is incorporated by reference herein.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Small displays may be used to form, or as a part of, mobile or wearable devices. For example, some displays may form or be part of a wearable heads-up display. Such wearable heads-up displays may communicate with other devices.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Figure 1:
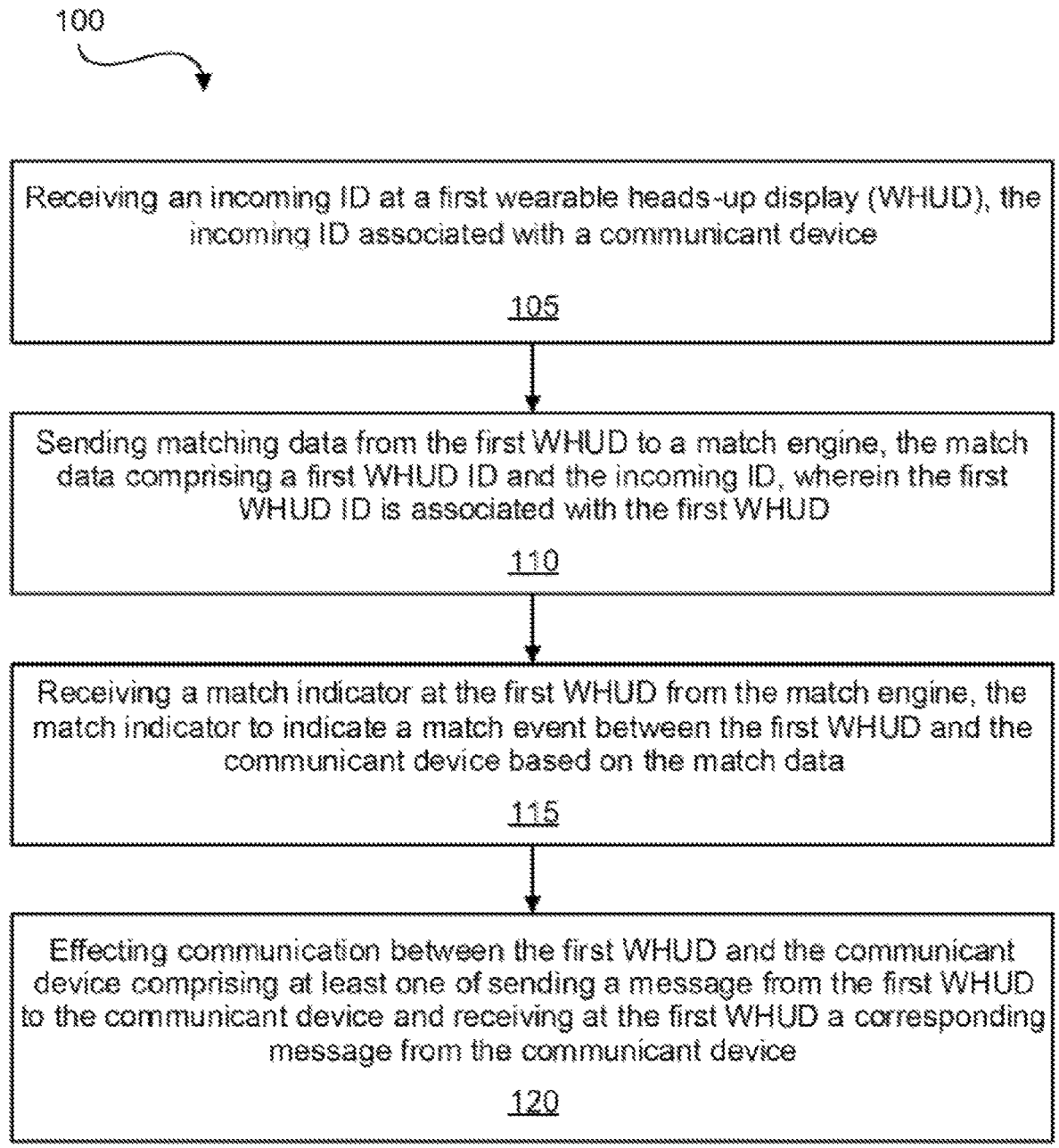
FIG. 1 shows a flowchart of an example method of communication between a wearable heads-up display and a communicant device, in accordance with some embodiments.

A wearable heads-up display (WHUD) may be used to communicate with a communicant device. In some examples, such a communicant device may include another WHUD, or another device capable of sending or receiving messages. Examples of such other devices may include base stations, and the like. FIG. 1 shows a flowchart of an example method 100 for communicating between a WHUD and a communicant device.

At box 105, an incoming identifier (ID) may be received at a first WHUD. The incoming ID may be associated with a communicant device. Example WHUDs are described in greater detail in relation to FIGS. 2 and 3. In some examples, the incoming ID may include a serial number, MAC address, or other identifier, associated with the communicant device. In some examples, the communicant device may include another WHUD, a base station, and the like. Examples of communication between a WHUD and another WHUD and between a WHUD and a base station are described in greater detail in relation to FIGS. 4 and 5 respectively. In examples where the communicant device includes another WHUD, the incoming ID may include a WHUD ID associated with the other WHUD. Similarly, in examples where the communicant device includes a base station, the incoming ID may include an ID associated with the base station. Such an ID may also be referred to as a base station ID.

Moreover, in some examples, the incoming ID may be received via a wireless electromagnetic signal, such as an optical transmission, a Bluetooth™ transmission, and the like. Moving onto box 110, match data may be sent from the first WHUD to a match engine. The match data may include a first WHUD ID and the incoming ID. The first WHUD ID may be associated with the first WHUD. In some examples, the match data may be sent directly from the first WHUD to the match engine. Moreover, in some examples, this transmission may include a data transmission over a wireless network.

Furthermore, it is contemplated that in some examples the match data may be sent indirectly from the first WHUD to the match engine. For example, the match data may be sent from the first WHUD to a mobile device, which mobile device may then send the match data to the match engine. In addition, in some examples, the match engine may include a computing engine including one or more processors in communication with one or more non-transitory processor-readable storage media. In some examples, the match engine may be implemented using cloud computing, distributed computing, virtualized computing, and the like. Furthermore, in some examples, the match engine may include one or more servers.

At box 115, a match indicator may be received at the first WHUD from the match engine. The match indicator may indicate a match event between the first WHUD and the communicant device based on the match data. In some examples, the match indicator may be generated by the match engine. Moreover, in some examples, the determination regarding matching may be made based on one or more of the first WHUD ID and the incoming ID, a timestamp associated with the receipt of the incoming ID at the first WHUD, location data associated with the locations of one or more of the first WHUD and the communicant device, and the like.

At box 120, communication may be effected between the first WHUD and the communicant device. This communication may include at least one of sending a message from the first WHUD to the communicant device, and receiving at the first WHUD a corresponding message from the communicant device. In this manner, the match engine may be used to authorize or enable communication between the first WHUD and the communicant device based on the match data. Such authorization may be reflected in the match indicator. Further details and examples of the matching process are described in relation to FIGS. 4-6. Once the match indicator is received by the first WHUD, then communication may take place between the first WHUD and the communicant device.

In some examples, if no match is made at the match engine between the first WHUD and the communicant device, the match engine may generate a no-match indicator. Moreover, in some examples, such a no-match indicator may be sent by the match engine and received by the first WHUD. Furthermore, in some examples, if no match is made at the match engine between the first WHUD and the communicant device, the match engine may not generate any indicator associated with match event. In such examples, in the absence of such an indicator no communication may be effected between the first WHUD and the communicant device.

As discussed above, in some examples the communicant device may include a second WHUD, and the incoming ID may include a second WHUD ID associated with the second WHUD. In such examples, receiving the incoming ID at the first WHUD may include receiving the second WHUD ID at the first WHUD. In such examples, method 100 may be used to authorize or enable communication between the first WHUD and the second WHUD.

Moreover, in some examples, receiving the incoming ID may include receiving an optical transmission from the communicant device. The optical transmission may include the incoming ID. In some examples the optical transmission may include an infrared (IR) transmission, and receiving the incoming ID may include receiving the IR transmission from the communicant device. As optical transmissions may be line-of-sight transmissions, the use of optical transmissions may allow for spatial aiming or targeting of the transmissions or communications between the first WHUD and the communicant device. The use of IR transmissions may allow such optical transmissions to remain invisible to human eyes. The use of optical transmissions is described in greater detail in relation to FIGS. 4-5.

Furthermore, in some examples, the optical transmission may include pulsed bursts. In some examples, the optical transmission may be binary-coded. Moreover, in some examples, the optical transmission may comprise pulsed binary-coded bursts. In such examples, receiving the incoming ID may include receiving the pulsed binary-coded bursts from the communicant device. In some examples, the use of pulsed bursts may provide some power savings compared to continuous optical transmissions. Moreover, the use of binary coding may provide a relatively simple way of encoding and transmitting transmissions or messages. The simplicity of binary encoding may provide corresponding savings in power and computational resources.

In addition, in some examples, method 100 may further include sending the first WHUD ID from the first WHUD to the communicant device. In some examples, this may allow the second WHUD to obtain its own authorization to communicate with the first WHUD. Moreover, in some examples, sending the first WHUD ID to the communicant device may allow the communicant device to accept or reject communication with the first WHUD.

In some examples, sending the first WHUD ID to the communicant device may include sending an optical transmission from the first WHUD to the communicant device. This optical transmission may include the first WHUD ID. Moreover, in some examples, the optical transmission may include an IR transmission, and sending the first WHUD ID to the communicant device may include sending the IR transmission from the first WHUD to the communicant device. Furthermore, in some examples, the optical transmission may include pulsed binary-coded bursts. In such examples, sending the first WHUD ID to the communicant device may include sending the pulsed binary coded bursts from the first WHUD to the communicant device.

In some examples, the match data may further comprise a timestamp to indicate the time of receipt of the incoming ID by the first WHUD. It is also contemplated that in some examples the timestamp may, instead or in addition, indicate the time of transmission of the incoming ID from the communicant device. In some examples, sending the match data from the first WHUD to the match engine may include sending the timestamp from the first WHUD to the match engine. As discussed above, in such examples, the timestamp may be taken into account when the match engine determines whether to authorize or enable communication between the first WHUD and the communicant device. For example, the match engine may use the timestamp to authorize communication between the first WHUD and the communicant device during certain events or during certain times of the day.

In addition, in some examples, match data may further include location data of at least one of the communicant device and the first WHUD. In such examples, sending the match data from the first WHUD to the match engine may include sending the location data from the first WHUD to the match engine. In such examples, the match engine may take the location data into account in determining whether to authorize or enable communication between the first WHUD and the communicant device. For example, the match engine may use the location data to authorize communication within a predetermined place, when the first WHUD and the communicant device are located within a given distance of one another, and the like.

Furthermore, in some examples, the communicant device may include a base station, and the incoming ID may include a base station ID associated with the base station. In such examples, receiving the incoming ID at the first WHUD includes receiving the base station ID at the first WHUD. In some examples where the communicant device includes a base station, receiving the base station ID at the first WHUD includes receiving, at the first WHUD, at least one of an optical transmission including the base station ID and a Bluetooth™ transmission including the base station ID. An example where the communicant device includes a base station is described in greater detail in relation to FIG. 5.

In some examples, sending the match data from the first WHUD to the match engine may include sending the match data wirelessly to at least one of the match engine, and a mobile device. Such a mobile device, in turn, may send the match data to the match engine. In some examples, sending the match data wirelessly may include sending the match data using a wireless data network. Moreover, such a wireless data network may include a cellular network, a Wi-Fi network, a LAN, an LTE network, and the like.

Moreover, as discussed above, in some examples the match event may include providing authorization for communication between first WHUD and the communicant device based on the match data.

In some examples, method 100 may further include receiving a communication request from the communicant device at the first WHUD, and sending the communication request from the first WHUD to the match engine. In such examples, receiving the match indicator at the first WHUD from the match engine may include receiving the match indicator at the first WHUD from the match engine to indicate the match event between the first WHUD and the communicant device based on the match data and the communication request. Moreover, the effecting the communication between the first WHUD and the communicant device may include receiving at the first WHUD the corresponding message from the communicant device. The corresponding message may be associated with the communication request.

Furthermore, in some examples, receiving the incoming ID at the first WHUD may include receiving outgoing communications from the communicant device at the first WHUD for a minimum time duration. The outgoing communications may include the incoming ID. In some examples, this minimum time duration may be less than or equal to about 10 seconds. Moreover, in some examples, this minimum time duration may be less than or equal to about 5 seconds. Furthermore, in some examples, this minimum time duration may be less than or equal to about one second. Other minimum time durations may also be used. Such a minimum time duration may reduce the likelihood of accidental or unintended connections or communications between the first WHUD and the communicant device.

In addition, in some examples, method 100 may further include, prior to sending the match data to the match engine, receiving at the first WHUD a user input to send the match data to the match engine. The user input may be from a user of the first WHUD. In such examples, the user may be able to control the sending of the match data to the match engine in order to control if or when communication between the first WHUD and the communicant device is authorized. In some examples, the user input may include the user initiating the sending of the match data to the match engine, approving or declining sending the match data to the match engine, and the like.

Moreover, in some examples, method 100 may further include, prior to effecting communication between the first WHUD and the communicant device, receiving at the first WHUD a user input to effect communication between the first WHUD and the communicant device. The user input may be from a user of the first WHUD. In such examples, the user may initiate or tailor the communication between the first WHUD and the communicant device.

In some examples where user input is received in the process of authorizing or effecting communication between the first WHUD and the communicant device, the user input may be received via an input terminal. In some examples the input terminal may be part of the first WHUD, for example, the input terminal may include a microphone to detect a voice or sound input from the user, a camera to detect a visual input from the user, an inertial measurement unit to detect a haptic or touch input from the user, and the like.

Moreover, in some examples, the input terminal may include a device or component separate from the first WHUD and in communication with the first WHUD. In some examples, the input terminal may be implemented as part of a mobile device in communication with the first WHUD. In some examples, such a mobile device may include a smart phone, a smart watch, a tablet, and the like. Moreover, in some examples, the input terminal may be implemented as a dedicated device that receives input from the user and cooperates with the first WHUD to communicate the input to the first WHUD. In some examples, such a dedicated device may include a ring worn around a finger of the user. Such a ring may receive touch input from the user, and communicate that input wirelessly to the first WHUD. In some examples, such a dedicated device may receive the touch input via a button or another touch sensor.

Figure 2:
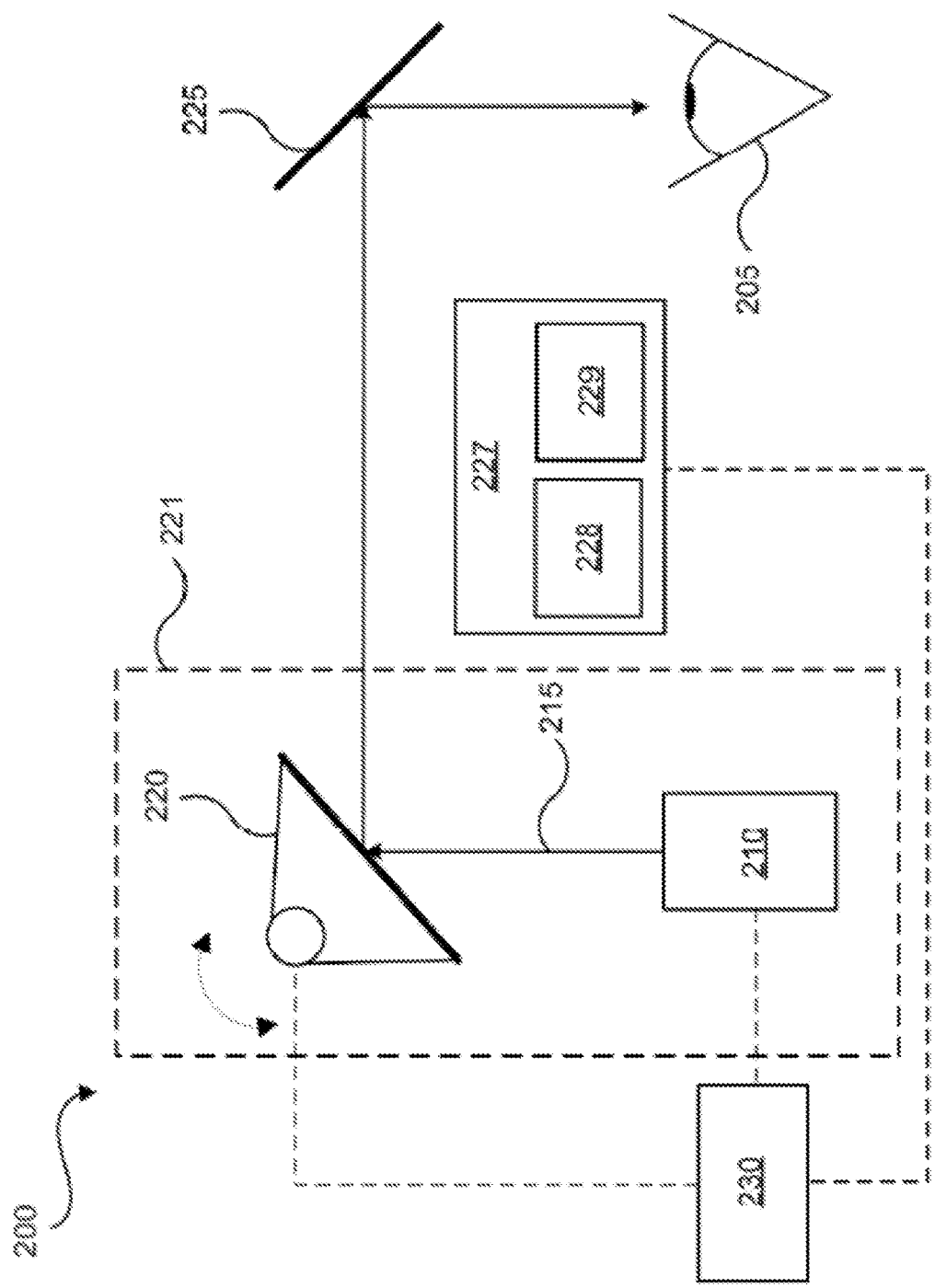
FIG. 2 shows a schematic representation of an example system which may be used to form or project an image, in accordance with some embodiments.

In some examples, the WHUDs described herein may include a light source, a spatial modulator, a display optic, a communication module, and a controller. Example displays and WHUDs are described in greater detail in relation to FIGS. 2 and 3. Turning now to FIG. 2, a schematic representation of an example system 200 is shown. System 200 may be used to form or project an image viewable by an eye 205 of a viewer. System 200 may also be referred to or described as an image projection device, a display device, a display system, or a display. System 200 may include a light source 210 to generate an output light 215. In some examples, system 200 may be used to implement method 100 and the other methods described herein. Light source 210 may include a laser, a light emitting diode, and the like. System 200 may also comprise a spatial modulator 220 to receive output light 215 from light source 210. In some examples, spatial modulator 220 may include a movable reflector, a micro-electro-mechanical system (MEMS), a digital micromirror device (DMD), and the like.

In some examples, light source 210 and spatial modulator 220 may together form a light engine 221. Moreover, while in FIG. 2 light engine 221 is shown as including a light source and a spatial modulator, it is contemplated that in some examples the light engine may include different components such as a micro-display, and the like. It is contemplated that in some examples, system 200 may include a light engine that has components different than those of light engine 221 shown in FIG. 2.

Furthermore, system 200 may include a display optic 225 to receive output light 215 from spatial modulator 220 and direct the output light towards eye 205 of a viewer. The viewer may also be referred to as the user of system 200. In some examples, display optic 225 may include an optical combiner such as a holographic optical element (HOE), and the like. Moreover, in some examples, display optic 225 may include an optical incoupler, a waveguide, and an optical outcoupler. Moreover, in some examples system 200 may be a part of or incorporated into a wearable heads-up display (WHUD). Such a heads-up display may have different designs or form factors, such as the form factor of eyeglasses, as is described in greater detail in relation to FIG. 3. In examples where system 200 is in the form factor of glasses, display optic 225 may be on or in a lens of the glasses.

System 200 may also include a communication module 227. In some examples, communication module 227 may include a receiver 228 and a transmitter 229. In some examples, receiver 228 may receive wireless signals. Moreover, in some examples, these wireless signals may include optical signals, Bluetooth™ signals, and the like. Similarly, in some examples, transmitter 229 may transmit wireless signals. Furthermore, in some examples, these wireless signals may include optical signals, Bluetooth™ signals, and the like.

In addition, system 200 includes a controller 230 in communication with light source 210, spatial modulator 220, and communication module 227. Controller 230 may control light source 210 and spatial modulator 220 to project an image. In some examples, the image to be projected may be a still image, a moving image or video, an interactive image, a graphical user interface, and the like.

In some examples, the controllers described herein such as controller 230 may include a processor in communication with a non-transitory processor-readable medium. The processor-readable medium may include instructions to cause the processors to control the light source and the spatial modulator as described in relation to the methods and systems described herein. Moreover, in some examples the controllers may be free-standing components, while in other examples the controllers may include functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 3:
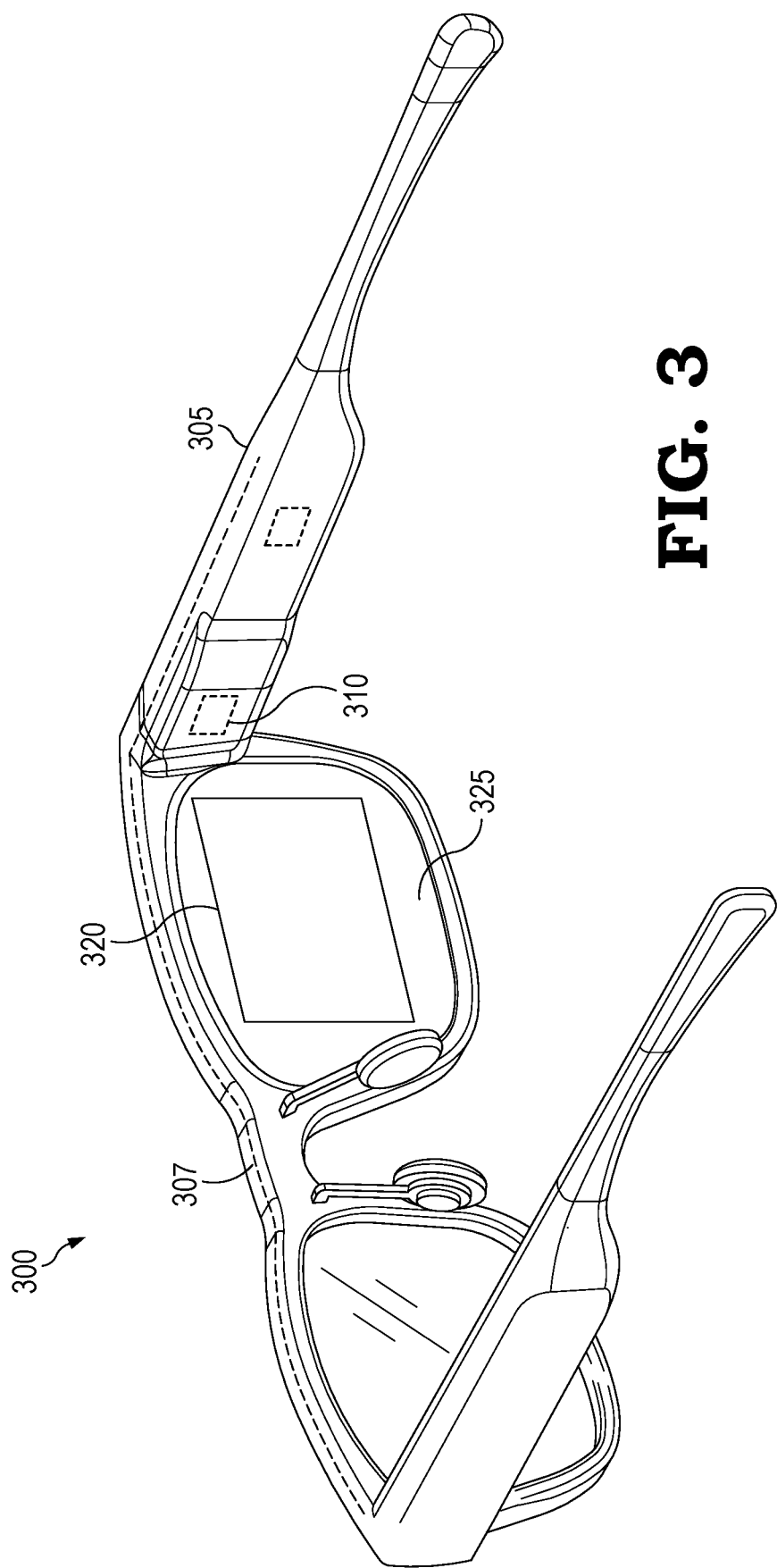
FIG. 3 shows a partial-cutaway perspective view of an example wearable heads-up display (WHUD), in accordance with some embodiments.

Turning now to FIG. 3, a perspective view of an example wearable heads-up display (WHUD) 300 is shown. WHUD 300 includes a support structure 305 that in use is worn on the head of a user and has the general form factor and appearance of an eyeglasses (e.g. sunglasses) frame. Eyeglasses or sunglasses may also be generically referred to as "glasses". Support structure 305 may carry components of a system to display an image, such as system 200. For example, the light source module may be received in a space 310 in a side arm of support structure 305. In other examples, one or more of the image projection and output light adjustment system components or systems described herein may be received in or carried by support structure 305.

The spatial modulator of the systems described herein may be received in or be part of support structure 305. The spatial modulator in turn may direct the output light onto a display optic 320 carried by a lens 325 of support structure 305. In some examples, display optic 320 may be similar in structure or function to display optic 225. Moreover, in some examples display optic 320 may include an optical incoupler, a waveguide, and an optical outcoupler.

WHUD 300 may also include a communication module similar to communication module 227 of system 200. This communication module may include one or more receivers and or transmitters similar respectively to receiver 228 and transmitter 229 of system 200. These receivers or transmitters may be located at different positions on support structure 305. In some examples, these receivers or transmitters may be carried by a front frame 307 of support structure 305. Moreover, in some examples, these receivers or transmitters may be carried by front frame 307 on or near a side of front frame 307 that faces away from a face of the user when WHUD 300 is worn by the user. Arrows 330, 335, and 340 show some example positions of such receivers and transmitters relative to front frame 307.

It is contemplated that in some examples, a receiver or transmitter need not be carried at each of the positions indicated by arrows 330, 335, 340, and that a receiver or transmitter may be present at one or more of those positions. It is also contemplated that in some examples, the receivers or transmitters may be carried by support structure 305 or front frame 307.

As shown in FIGS. 2 and 3, in some examples the functions and methods described herein may be performed by a display system or WHUD, such as by system 200 or WHUD 300, which display system or WHUD may include a controller such as controller 230. The functions of the WHUD, and its controller, are described herein in relation to system 200 and its components. It is contemplated that similar functions may be performed by WHUD 300, and the other WHUDs described herein.

Controller 230 may receive an incoming ID associated with the communicant device. In some examples, the incoming ID may include a serial number, MAC address, or other identifier associated with the communicant device. The incoming ID may be received from the communicant device at communication module 227. Moreover, controller 230 may control communication module 227 to send match data to a match engine. The match data may include a WHUD ID and incoming ID. The WHUD ID may be associated with the WHUD, such as system 200 or WHUD 300. In some examples, the IDs described herein in relation to WHUDs or communicant devices may be IDs that are unique to their respective WHUDs or communicant devices. Moreover, in some examples, the IDs described herein may be selected from a sufficiently large set of possible IDs to make each ID nearly or practically unique to its respective WHUD or communicant device. Furthermore, in some examples, the IDs described herein may be unique to a user associated with a WHUD or a communicant device.

Moreover, while FIG. 2 shows receiver 228 and transmitter 229 as being located side by side in communication module 227, it is contemplated that in some examples the receiver and transmitter of the communication module may be spaced from one another, or may be carried components or at different positions relative to the display system or WHUD.

Controller 230 may also receive a match indicator from the match engine. The match indicator may indicate a match event between the WHUD and the communicant device based on the match data. As discussed above, the WHUD may include system 200, WHUD 300, or another one of the WHUDs described herein. Furthermore, controller 230 may effect communication between the WHUD and the communicant device. To effect the communication controller 230 may perform at least one of the following: controller 230 may control communication module 227 to send a message to the communicant device, and controller 230 may receive a corresponding message from the communicant device.

In some examples, controller 230 may further control light source 210 and spatial modulator 220 to display to the user at least one of the message and the corresponding message. Furthermore, in some examples, the communicant device may include a second WHUD. In such examples, the incoming ID may include a second WHUD ID associated with the second WHUD.

Moreover, in some examples, receiver 228 of communication module 227 may include an optical receiver. Such an optical receiver may receive an optical transmission from the communicant device. The optical transmission may include the incoming ID. In some examples, the optical transmission may include an IR transmission. Moreover, in some examples, the optical transmission may include pulsed binary-coded bursts.

In addition, in some examples, the optical receiver may include an avalanche photodiode and a transimpedance amplifier. In some examples, such an optical receiver may further include a bandpass filter. It is also contemplated that in some examples the optical receiver may include a PIN diode and a transimpedance amplifier. In addition, it is contemplated that in some examples the optical receiver may include a camera.

In some examples, an avalanche photodiode may receive a photon of an optical transmission and in response generate one or more electrons or an electric current. The transimpedance amplifier may amplify this electric current, and may convert it to a voltage signal. In some examples, the bandpass filter may be used to further filter the voltage signal. Moreover, in some examples, this filtering may serve to enhance the signal-to-noise ratio in the voltage signal. Furthermore, in some examples, a PIN diode may be less susceptible to thermal changes and may be able to operate at lower voltages compared to an avalanche photodiode. As such, in some examples, the avalanche photodiode may be replaced with a PIN diode.

In some examples, controller 230 may further control communication module 227 to send the WHUD ID to the communicant device. In some examples, transmitter 229 of communication module 227 may include an optical transmitter. To send the WHUD ID to the communicant device controller 230 may control the optical transmitter to send an optical transmission to the communicant device. The optical transmission may include the WHUD ID.

In some examples, the optical transmission sent to the communicant device may include an IR transmission. Moreover, in some examples, this optical transmission may include pulsed binary-coded bursts. Furthermore, in some examples, the optical transmitter may include a vertical cavity surface emitting laser (VCSEL).

In some examples, the match data may further include a timestamp to indicate a time of receipt of the incoming ID by the WHUD. Moreover, in some examples, the match data may further include location data of at least one of the communicant device and the WHUD.

Furthermore, in some examples, the communicant device may include a base station to transmit the incoming ID. The incoming ID may include a base station ID associated with the base station. In some examples, receiver 228 of communication module 227 may include one or more of an optical receiver and a Bluetooth™ receiver. To receive the base station ID from the base station controller 230 may receive from the base station at least one of an optical transmission including the base station ID and a Bluetooth™ transmission including the base station ID.

In addition, in some examples, to send the match data from the WHUD to the match engine controller 230 may control communication module 227 to send the match data wirelessly to at least one of the match engine and a mobile device. The mobile device, in turn, may send the match data to the match engine. In some examples, to send the match data wirelessly controller 230 may control communication module 227 to send the match data using a wireless data network. Moreover, in some examples, the wireless data network may include at least one of a cellular network, a Wi-Fi network, a LAN, an LTE network, and the like.

In some examples, the match event may include providing an authorization for communication between the WHUD and the communicant device based on the match data. Moreover, in some examples, controller 230 may further receive a communication request from the communicant device. Controller 230 may also control the communication module 227 to send the communication request to the match engine. In such examples, to receive the match indicator at the WHUD from the match engine, controller 230 may receive the match indicator at the WHUD from the match engine to indicate the match event between the WHUD and the communicant device based on the match data and the communication request. Moreover, to effect the communication between the WHUD and the communicant device controller 230 may receive the corresponding message from the communicant device. The corresponding message may be associated with the communication request.

In addition, in some examples, to receive the incoming ID controller 230 may receive outgoing communications from the communicant device for a minimum time duration. The outgoing communications may include the incoming ID. Furthermore, in some examples, prior to controlling communication module 227 to send the match data to the match engine, controller 230 may further receive a user input to send the match data to the match engine. The user input may be from the user of the WHUD.

Moreover, in some examples, prior to effecting the communication between the WHUD and the communicant device, controller 230 may further receive a user input to effect the communication between the WHUD and the communicant device. The user input may be from the user of the WHUD.

Figure 4:
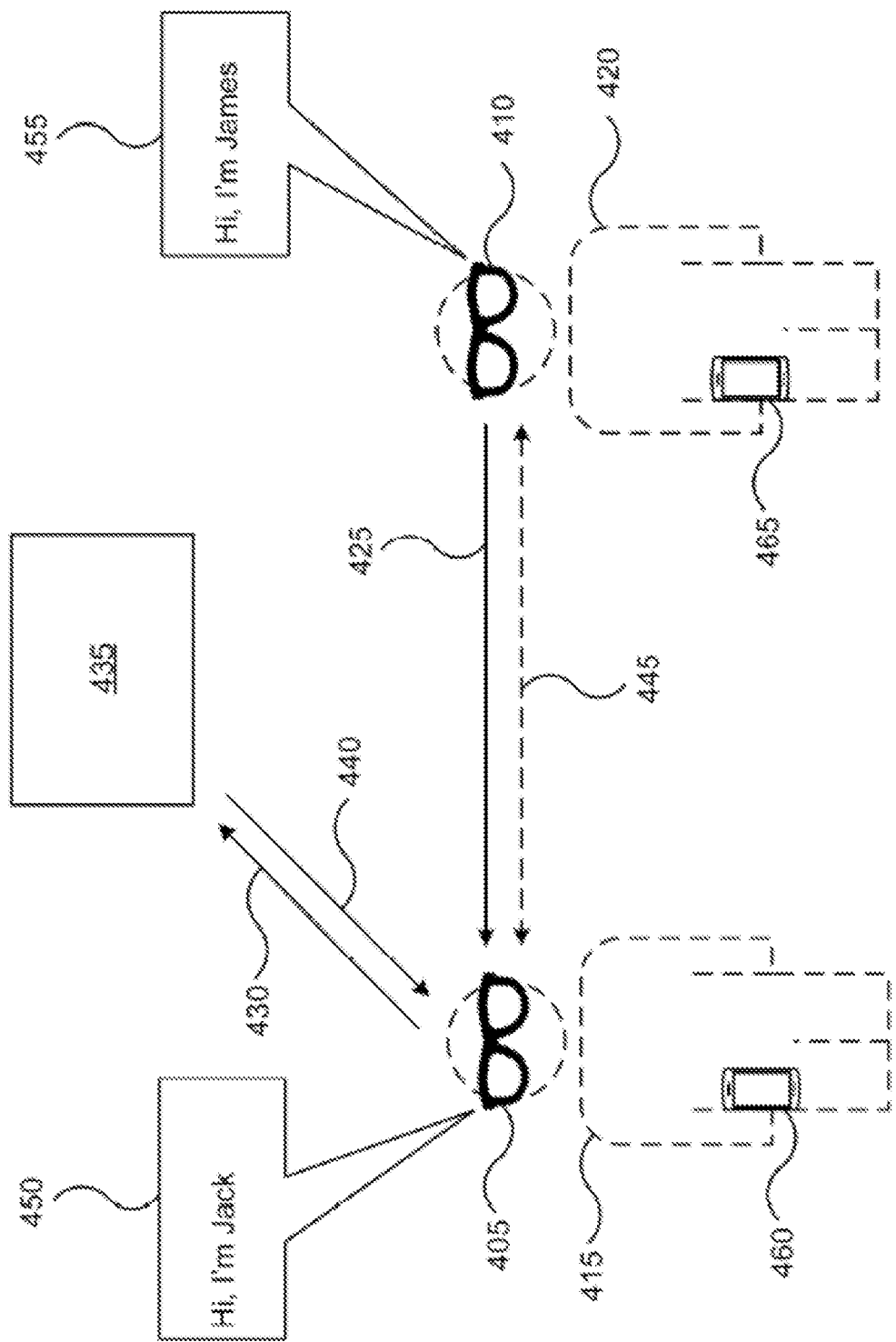
FIG. 4 shows a schematic representation of two example WHUDs communicating with one another, in accordance with some embodiments.

Turning now to FIG. 4, a schematic representation is shown of a WHUD 405 communicating with a second WHUD 410. WHUDs 405 and 410 may be similar to system 200 and WHUD 300 described in relation to FIGS. 2 and 3 respectively. WHUD 405 may be worn by a respective user 415, and WHUD 410 may be worn by a respective user 420. WHUD 405 may receive an incoming ID 425 from WHUD 410. Incoming ID 425 may include a WHUD ID associated with WHUD 410.

In some examples, incoming ID 425 may be transmitted from WHUD 410 to WHUD 405 using a wireless transmission. Moreover, in some examples, this wireless transmission may include an optical transmission. Optical transmissions are line-of-sight and may have relatively small divergence or cones of propagation. This, in turn, may allow for targeted or directional communication between WHUD 405 and WHUD 410.

In some examples, the optical transmission may be transmitted as pulsed binary-coded bursts. In addition, in some examples, error correcting codes may be incorporated into the transmissions to reduce the likelihood or rate of errors in the communications between the WHUD and the communicant device. In the example shown in FIG. 4, the communicant device includes WHUD 410. Examples of such error correcting codes may include Reed-Solomon error correcting codes, and the like.

Moreover, in some examples, a wavelength of light outside of the visible spectrum may be used for the optical transmissions between a WHUD and a communicant device, as the communications between WHUD 410 and WHUD 405. For example, IR transmission may be used. In some examples, the IR transmission may have a wavelength in the range of about 700 nm to about 1 mm. Moreover, in some examples, the IR transmission may have a wavelength in the near infrared. Furthermore, in some examples, near infrared may include a wavelength range from about 700 nm to about 1400 nm. In some examples, the IR transmissions may use a wavelength of about 940 nm. Using a wavelength outside of the visible spectrum may reduce interference or artifacts visible to users, such as users 415 and 420, caused by the optical transmissions by or between WHUD 410 and WHUD 405.

In addition, in some examples, divergence or the cone of propagation of such optical transmissions may be tailored to tailor the directionality of the optical transmissions. In some examples, the divergence of the optical transmissions may be tailored to cover an area about the size of the face of a human user, such as user 415 or 420, at a distance of about 2 m. Other divergences or cones of propagation are also contemplated.

It is also contemplated that in some examples, transmissions other than optical transmissions may also be used between WHUD 405 and a communicant device such as WHUD 410. Examples of such other transmissions may include stereo Bluetooth™, and the like. Similar to optical transmissions, stereo Bluetooth™ may also exhibit controlled or directional propagation similar to line-of-sight propagation. While optical and other types of transmissions are described in relation to transmission of incoming ID 425, it is contemplated that in some examples, other communications between WHUD 405 and the communicant device, such as WHUD 410, may also include similar optical or other types of transmissions.

In some examples, WHUD 410 may send to WHUD 405 additional information in addition to incoming ID 425. Such additional information may include a timestamp associated with the transmission of incoming ID 425, location data associated with WHUD 410, and the like. Upon receipt of incoming ID 425, WHUD 405 may send match data 430 to a match engine 435. In some examples, the match data may be communicated wirelessly to match engine 435.

While FIG. 4 shows WHUD 405 sending match data 430 directly to match engine 435, it is contemplated that in some examples, the communication between WHUD 405 and match engine 435 may be effected via a data communication network. In some examples, such a data communication network may include a cellular network, a Wi-Fi network, a LAN, an LTE network, and the like through any number of intervening communicative devices.

In addition, while FIG. 4 shows WHUD 405 sending match data 430 directly to match engine 435, it is contemplated that in some examples, WHUD 405 may send the match data to a mobile device 460 of user 415, and mobile device 460 may then send the match data to match engine 435.

The match data sent to match engine 435 may include incoming ID 425 and a WHUD ID associated with WHUD 405. The WHUD ID may include a serial number or other identifier of WHUD 405. Based on match data 430, match engine 435 may authorize or otherwise enable communication between WHUD 405 and WHUD 410. To authorize or enable such communication, match engine 435 may send a match indicator 440 to WHUD 405. In some examples, the determination of whether to enable or authorize communication may be based on whether the ID of WHUD 410 is on a black list or white list. If the ID is on the white list, the communication will be authorized or enabled; whereas, if the ID is on the blacklist, communication may not be authorized or enabled.

Moreover, in some examples, the determination of whether to enable or authorize communication may be based on whether WHUD 405 is in a public mode or private mode. The information regarding which mode WHUD 405 is in may be communicated to match engine 435 as part of match data 430. If WHUD 405 is in public mode, match engine 435 may authorize or enable communication with WHUD 410. If, on the other hand, WHUD 405 is in public mode, match engine 435 may determine not to authorize or enable communication with WHUD 410. As discussed above, the determination of match engine 435 to enable or authorize communication may be reflected in match indicator 440. This match indicator 440 may then be received by WHUD 405. Match indicator 440 may indicate a match event between WHUD 405 and the communicant device based on match data 430. In the example of FIG. 4, the communicant device is WHUD 410.

Based on match indicator 440, WHUD 405 may then effect communication 445 between WHUD 405 and WHUD 410. Communication 445 may include WHUD 405 sending a message to WHUD 410 or WHUD 405 receiving a message from WHUD 410. As shown in FIG. 4, in some examples communication 445 may be effected via directional transmissions between WHUDs 405 and 410. Examples of such directional transmissions may include optical transmissions, stereo Bluetooth™ transmissions, and the like.

It is also contemplated that in some examples, communication 445 may be effected via nondirectional transmissions such as Bluetooth™ transmissions, cellular transmissions, and the like. Moreover, while FIG. 4 shows communication 445 being effected directly between WHUDs 405 and 410, it is contemplated that in some examples, communication 445 may be affected indirectly between WHUDs 405 and 410. For example, to effect communication 445, WHUD 405 may communicate with mobile device 460. Mobile device 460, in turn, may communicate directly or indirectly with a mobile device 465 of user 420. Mobile device 465 may then communicate with WHUD 410.

FIG. 4 shows example greetings 450 and 455 that may be displayed to users 415 and 420 by their respective WHUDs 405 and 410 as part of effecting communication 445. In some examples, the content of such greetings may be generated by match engine 435 and communicated to WHUD 405 as part of match indicator 440. While not shown in FIG. 4, it is contemplated that in some examples match engine 435 may also communicate with WHUD 410. In some examples, the contents of such communications may include the content of the greeting to be displayed by WHUD 410 to user 420 as part of effecting communication 445.

In some examples, the content of such greetings may be selectable or dynamically generated. In some examples, the content of the greetings may be selectable or dynamically generated via an app executable on WHUD 405, or on mobile device 460 in communication with WHUD 405.

Moreover, in some examples, the content of the greetings may be tailored based on the context of the interaction between user 415 wearing WHUD 405 and user 420 wearing WHUD 410. For example, the content of the greetings may be selected based on the location of one or more of user 415 wearing WHUD 405 and user 420 wearing WHUD 410. The content of the greetings may also be selected based on an event being attended by one or both of the users, or by other factors such as applications running on the WHUDs or their corresponding mobile devices, the time of day, a user status or message defined by the user, other predetermined or user-selectable settings, and the like.

In some examples, such greetings may be muted based on the context of the interaction between user 415 wearing WHUD 405 and user 420 wearing WHUD 410. It is also contemplated that in some examples user input may be received as part of the communication process between WHUD 405 and the communicant device such as WHUD 410. For example, input from user 415 may be received and used to determine whether match data 430 is sent to match engine 435. Such an arrangement may be used to give user 415 control over whether or not communications are authorize or enabled between WHUD 405 and WHUD 410 of user 420.

Furthermore, in some examples, user input may be received after match indicator 440 is received by WHUD 405 and before communication is effected between WHUDs 405 and 410. Such an arrangement, in turn, may be used to give user 415 control over whether communication 445 is effected in response to receiving match indicator 440.

It is also contemplated that input from user 420 may also be received in relation to the transmissions made by WHUD 410, or communications sent or received by WHUD 410. For example, input may be received from user 420 to give the user control over whether WHUD 410 transmits incoming ID 425 to WHUD 405 to initiate the communication between WHUDs 405 and 410. Moreover, in some examples, input may be received from user 420 to control whether communication 445 is sent or received by WHUD 410.

In some examples receiving such user input may include receiving the input directly via the WHUD of the user. Examples of receiving the input directly via the WHUD may include receiving sound inputs at the WHUD from the user, receiving visual inputs at the WHUD from the user, receiving touch inputs at the WHUD from the user, and the like. Furthermore, in some examples, the user input may be received at the mobile device of the user, which mobile device may be in communication with the WHUD of the user.

Moreover, in some examples, the user may use a dedicated input terminal for providing input to the WHUD. For example, the user may use a ring capable of receiving input from a finger or hand of the user. Such a ring may be in communication with the WHUD of the user. In this manner, the user may be able to use the ring to provide touch input to the WHUD via the ring.

It is also contemplated that in some examples, user input may be used to determine the content of the greetings or other communications effected between WHUD 405 and WHUD 410. For example, user input may be received to select between different types of greetings or messages to be included in the communications between WHUD 405 and WHUD 410.

Moreover, it is contemplated that in some examples match engine 435 may use a predetermined or dynamically generated list of permissions to determine whether to authorize or enable communications between WHUD 405 and WHUD 410. In some examples, the list of permissions may be dynamically generated or modified based on the contexts of WHUDs 405 and 410 and their respective users 415 and 420.

In some examples, match engine 435 may use different types of match data to determine whether to authorize or enable communications between WHUD 405 and the communicant device. For example, match engine 435 may use the incoming ID of the communicant device and the WHUD ID of WHUD 405 to determine whether to authorize communications. Moreover, in some examples, match engine 435 may also take into account location data or timestamps when determining whether to authorize communications.

For example, location data may be used to determine whether user 415 wearing WHUD 405 and user 420 wearing WHUD 410 are located sufficiently near each other to justify authorizing communications. In some examples, being sufficiently near may include being located in the same building, the same geographical area, within a certain radius of one another, and the like.

Moreover, in some examples, match engine 435 may also take into account timestamps to determine whether to authorize communications. Such timestamps may be associated with the time of transmission or receipt of the directional communications between WHUDs 405 and 410. Such timestamps may be used by match engine 435 to determine whether directional communications between WHUD 405 and 410 have been sufficiently close in time to justify authorizing the communication between WHUDs 405 and 410. Furthermore, in some examples, such timestamps may be used to determine whether to authorize communications based on considerations such as the time of day, whether the timestamps coincide with a particular event or activity, and the like.

Figure 5:
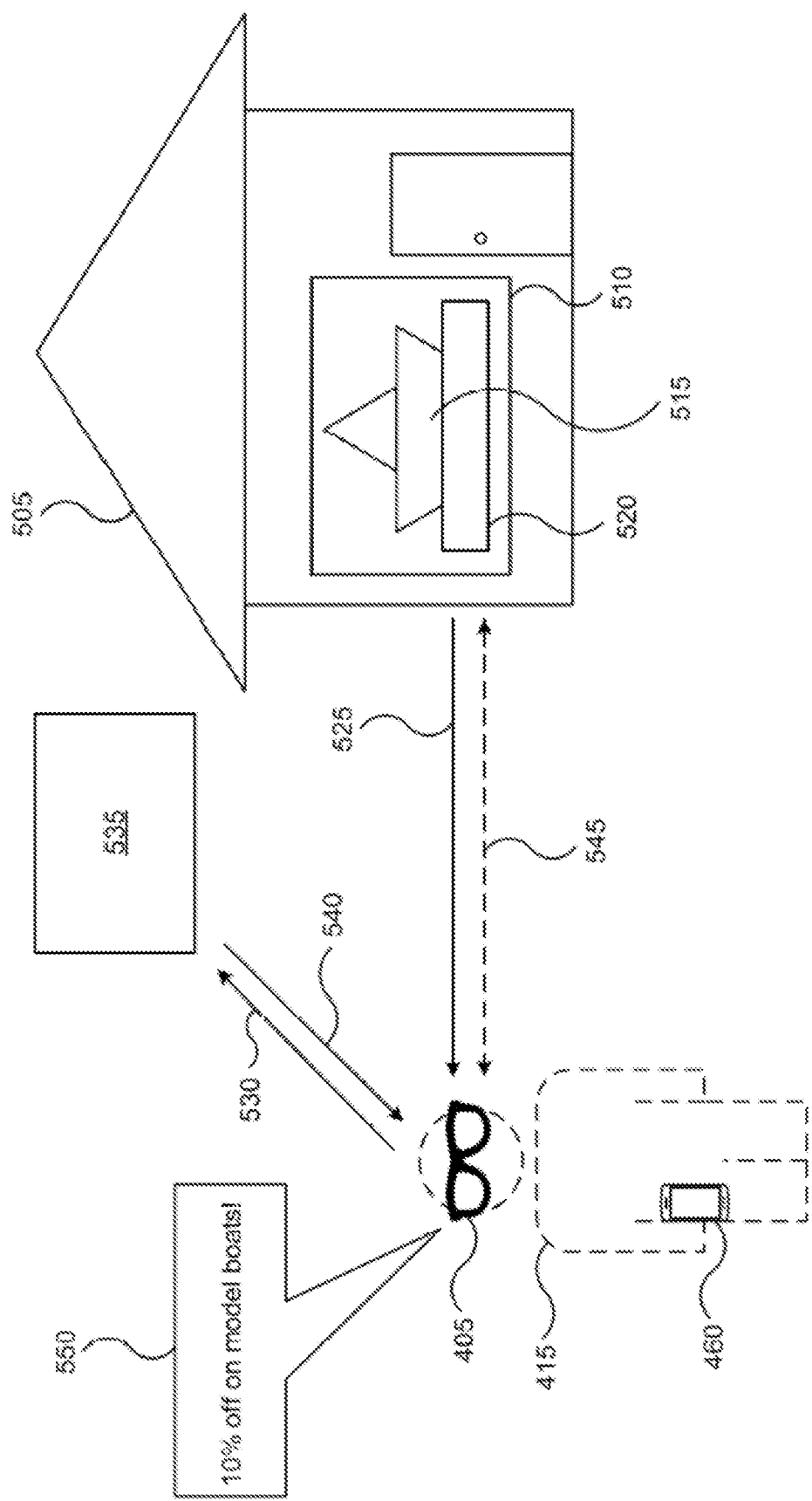
FIG. 5 shows a schematic representation of an example WHUD communicating with an example base station, in accordance with some embodiments.

Turning now to FIG. 5, a schematic representation is shown of communications between a WHUD 405 and a communicant device. FIG. 5 shows a shop 505 having a shop window 510. Displayed in the shop window is a boat 515 for sale. Boat 515 is positioned on a base station 520. In the example shown in FIG. 5, the base station 520 acts as the communicant device.

In some examples, base station 520 may transmit its base station ID to form incoming ID 525. Moreover, in some examples base station 520 may operate in an always-on mode, whereby base station 520 transmits its base station ID regardless of whether base station 520 receives a transmission from WHUD 405 to trigger the transmission of the base station ID. In such examples, base station 520 may transmit its base station ID on a schedule which may be continuous, intermittent, periodic, random or pseudorandom, and the like.

Moreover, in some examples, base station 520 may transmit its base station ID using directional transmissions such as optical transmissions and the like. In this manner, base station 520 may aim or target its transmissions at the users, such as user 415, who may be in the vicinity of or looking at shop window 510. It is also contemplated that in some examples base station 520 may transmit its base station ID using nondirectional transmission such as Bluetooth™ transmissions, and the like. In these examples the transmission may be detectable by WHUDs within a predetermined distance from base station 520 based on the range or strength of the transmissions from base station 520.

In addition, in some examples, base station 520 may transmit its base station ID in a sometimes-on mode. In this mode, the transmission of the base station ID by base station

520 is triggered by base station 520 receiving a transmission from WHUD 405. Such a transmission from WHUD 405 may include a directional transmission from WHUD 405 such as an optical transmission. It is also contemplated that in some examples the transmission from WHUD 405 may be a proximity-based transmission, the receipt of which by base station 520 may indicate to the base station 520 that WHUD 405 is within a given distance of base station 520.

As discussed above, incoming ID 525, such as the base station ID, may be received by WHUD 405. WHUD 405 may then send match data 530 to a match engine 535. Match engine 535 may be similar in structure or function to match engine 435. In some examples, match data 530 may include incoming ID 525 and a WHUD ID of WHUD 405. Based on match data 530, match engine 535 may then send a match indicator 540, which match indicator 540 may be received by WHUD 405. Based on match indicator 540 WHUD 405 may effect communication 545 between WHUD 405 and base station 520.

In some examples, effecting communication 545 may include WHUD 405 displaying a message 550 to user 415. Moreover, in some examples, the content of message 550 may be provided to WHUD 405 as part of sending incoming ID 525 to WHUD 405. Furthermore, in some examples, the content of message 550 may be provided to WHUD 405 by match engine 535. In such examples, match engine 535 may determine the content of message 550 based on the base station ID sent to match engine 535 as part of match data 530. Match engine 535 may then communicate the content of message 550 to WHUD 405 as part of sending matching indication 540 to WHUD 405.

It is also contemplated that in some examples, the content of message 550 may be tailorable or dynamic. For example, the content of message 550 may be tailored based on the WHUD ID of WHUD 405 sent to match engine 535 as part of match data 530, and/or based on data attributable to a user of WHUD 405 and accessible by match engine 535. Moreover, in some examples, the content of message 550 may be tailored based on the nature of the interaction between WHUD 405 worn by user 415 and base station 520. For example, the content of message 550 may be tailored based on the distance between WHUD 405 worn by user 415 and base station 520.

Furthermore, in some examples, the content of message 550 may be tailored based on how intensely or attentively user 415 looks at or otherwise interacts with boat 515 or base station 520. The level of intensity or attentiveness of user 415 in relation to boat 515 of base station 520 may be determined based on the continuousness or duration of interaction between WHUD 405 and base station 520 via directional transmissions such as optical transmissions and the like. In other words, if user 415, wearing WHUD 405, looks at boat 515 or its base station 520 continuously or for a long time, a determination may be made that user 415 has a high level or intensity of interest or attentiveness towards boat 515. This level or intensity of interest or attentiveness may, in turn, be used to tailor the content of message 550.

In the example of FIG. 5, base station 520 need not interact with match engine 535. As such, in some examples, base station 520 need not have network or wireless communication connectivity. This in turn, may allow base station 520 to have a simpler or less expensive construction. In addition, it is contemplated that in some examples, input from user 415 may be received in order to control or tailor communications between WHUD 405 and base station 520. For example, the user input may be received to control whether match data 530 is sent to match engine 535.

Moreover, in some examples, user input may be received to control whether message 550 is displayed by WHUD 405 to user 415.

Furthermore, in some examples, user input may be received to determine further interaction between WHUD 405 and base station 520. For example, upon receipt of the initial message 550, user input may be received to request or obtain further information, or to activate or cash-in a promotion. Moreover, in some examples, user input may be received to electronically purchase the item associated with base station 520. In some examples, to accomplish such a purchase, the user may not need to enter shop 505 or to otherwise physically interact with boat 515 or shop 505.

While FIGS. 4 and 5 each show a one-to-one communication scheme where one WHUD is in communication with one communicant device, it is contemplated that in some examples the communication scheme may be one-to-many, many-to-one, or many-to-many. Methods and devices similar to those described herein may be used for such one-to-many, many-to-one, and many-to-many communication schemes.

Figure 6:
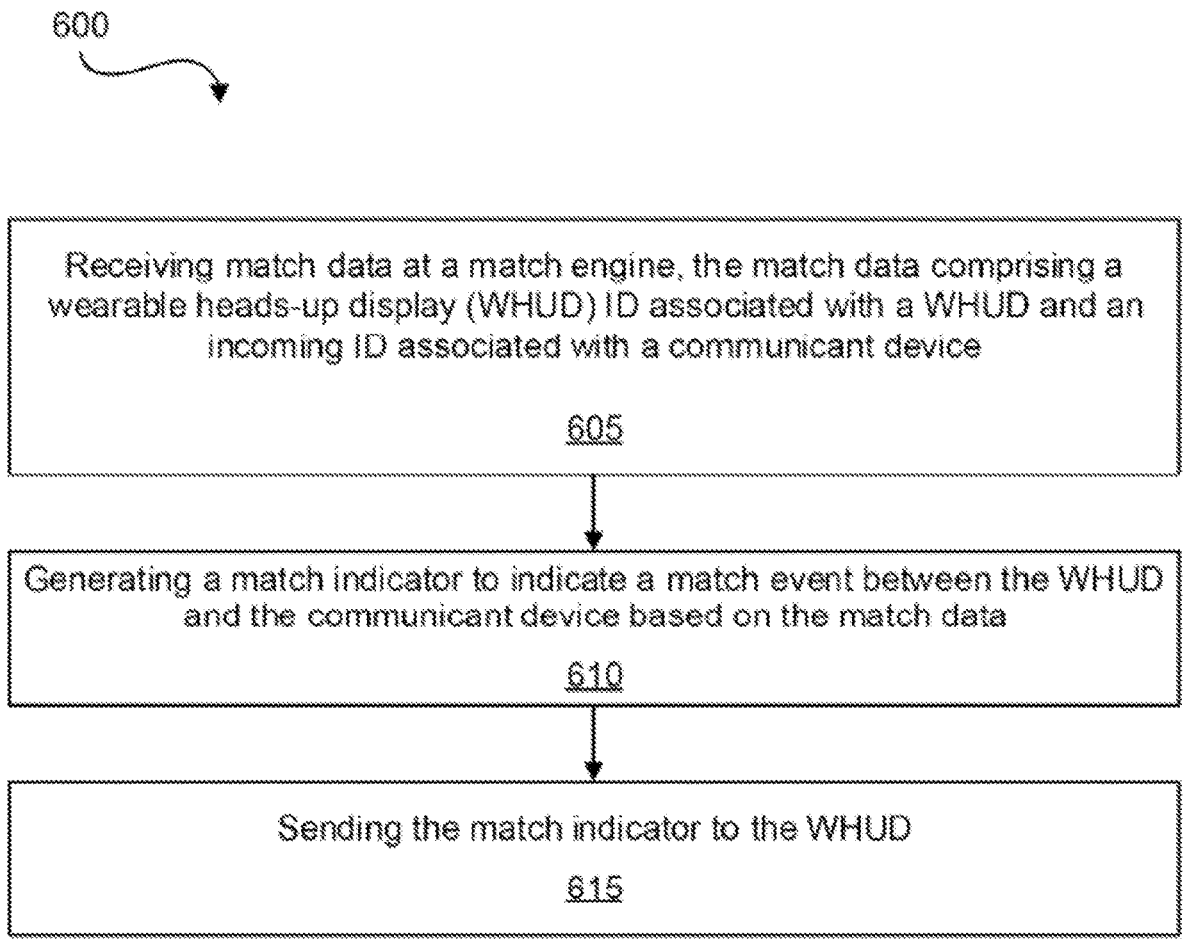
FIG. 6 shows a flowchart of an example method of operating a match engine, in accordance with some embodiments.

Turning now to FIG. 6, a flowchart is shown of an example method 600. Method 600 may be performed by a match engine to authorize or otherwise enable communication between a WHUD and a communicant device. At box 605, match data may be received at a match engine. The match data may include a wearable heads-up display (WHUD) ID associated with a WHUD and an incoming ID associated with a communicant device.

At box 610, a match indicator may be generated to indicate a match event between the WHUD and the communicant device based on the match data. In some examples, a no-match indicator may be generated if no match can be made between the WHUD and the communicant device based on the match data. Moreover, in some examples, no indicator may be generated if no match can be made between the WHUD and the communicant device. At box 615, in turn, the match indicator may be sent to the WHUD. In some examples, method 600 may further include sending the match indicator to the communicant device.

Moreover, in some examples, method 600 may further include routing a message between the WHUD and the communicant device. In such examples, the match engine may rout between the WHUD and the communicant device messages that are sent via data networks. In some examples, such messages that are sent via data networks may be different than communications that are affected directly between the WHUD and the communicant device using optical transmissions, Bluetooth™ transmissions, and the like.

In some examples, the match data may include location data of one or more of the communicant device and the WHUD. Receiving the match data at the match engine may include receiving the location data at the match engine. Moreover, generating the match indicator may include generating the match indicator based on locations of the WHUD and the communicant device relative to one another. For example, the match indicator may be generated if the locations of the WHUD and the communicant device are such that the WHUD is within a predetermined distance from the communicant device.

Furthermore, in some examples, match data may include at least one timestamp associated with at least one of the WHUD ID and the incoming ID. Moreover receiving the match data at the match engine may include receiving the at least one timestamp at the match engine.

In addition, in some examples, match data may include a first timestamp associated with the WHUD ID and a second timestamp associated with the incoming ID. In such examples, generating the match indicator may include generating the match indicator based on the first timestamp and the second timestamp relative to one another. For example, the match indicator may be generated if the first and second timestamps are within a given time window relative to one another.

In some examples, method 600 and the related methods described herein may be performed by match engines 435 and 535. Moreover, while FIGS. 4 and 5 show match engines 435 and 535 as being separate from WHUDs 405 and 410, it is contemplated that in some examples, the match engine or its functionality may be incorporated into, or performed by, one or more of WHUDs 405 and 410, or by one or more of mobile devices 460 and 465. In such examples where the match engine is part of a WHUD, the communications that are described as taking place between WHUD 405 and match engine 435 or 535 in FIGS. 4 and 5, may include communications between various components internal to a given WHUD. In addition, in such examples where the matching engine as part of a mobile device associated with a WHUD, the communications that are described as taking place between WHUD 405 and match engine 435 or 535 in FIGS. 4 and 5, may include communications between the WHUD and its associated mobile device.

Figure 7:
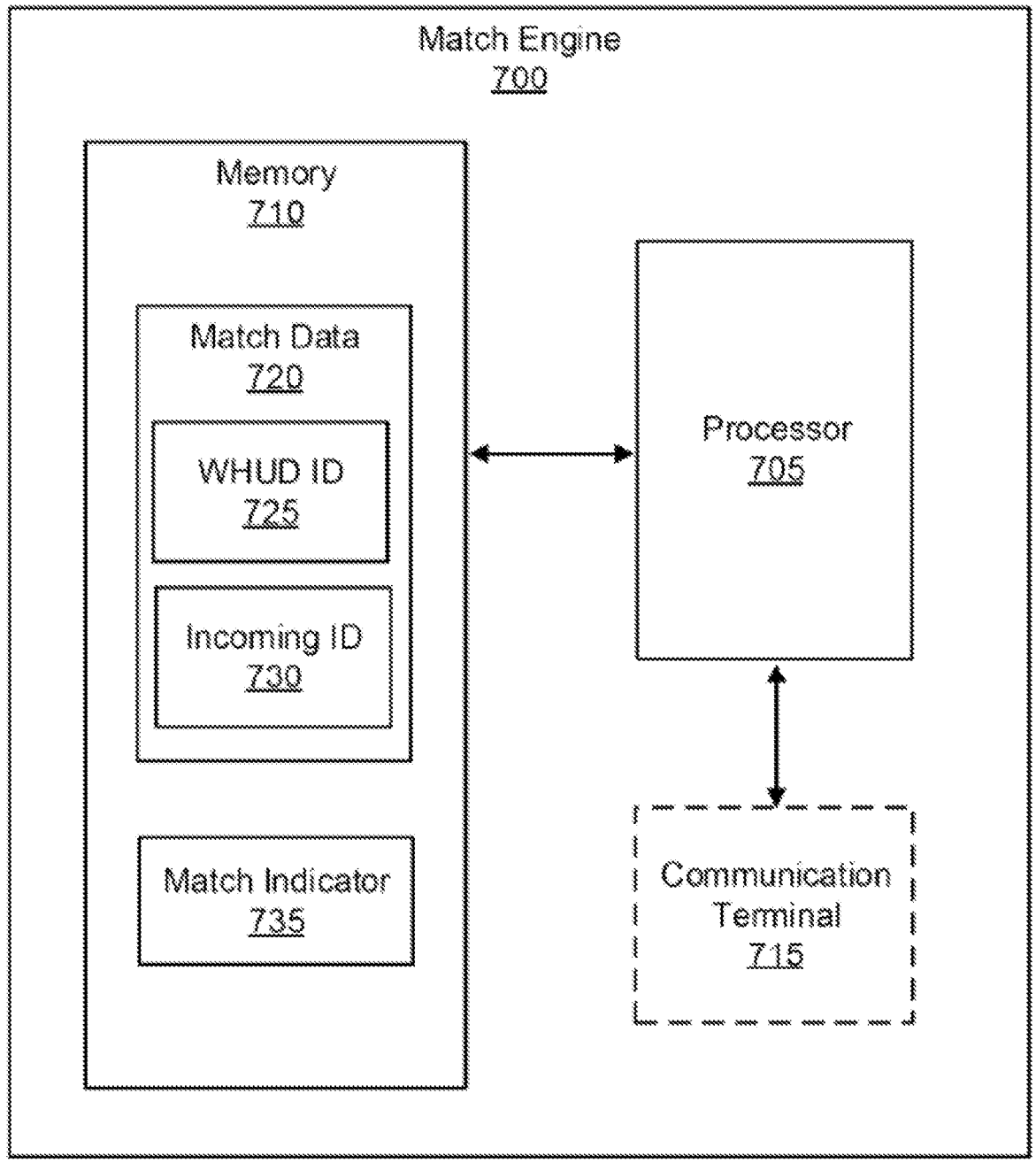
FIG. 7 shows a schematic representation of an example match engine, in accordance with some embodiments.

Turning now to FIG. 7, a schematic representation is shown of an example match engine 700. Match engine 700 may include a processor 705 in communication with a memory 710. In some examples, match engine 700 may also include a communication terminal 715 in communication with processor 705.

Memory 710 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 705 may include a central processing unit (CPU), a graphics processing unit (GPU), a microcontroller, a microprocessor, a processing core, a field-programmable gate array (FPGA), or similar device capable of executing instructions. Processor 705 may cooperate with the memory 710 to execute instructions. Moreover, communication terminal 715 may include a wired or wireless communication terminal to send or receive data from a WHUD. It is contemplated that in some examples, match engine 700 may be implemented using one or more servers, cloud computing, distributed computing, as a virtual or virtualized machine, and the like.

In some examples, match engine 700 may have the features or perform the functions of match engines 435, 535, and the other match engines described herein. Moreover, in some examples, match engine 700 may perform method 600, or the other associated methods described herein. For example, match engine 700 may receive match data 720 from a WHUD. In some examples, match engine 700 may receive match data 720 via communication terminal 715. Match data 720 may include a WHUD ID 725 and an incoming ID 730 of a communicant device. WHUD ID 725 and incoming ID 730 may be similar to the corresponding WHUD IDs and incoming IDs described herein in relation to FIGS. 1-6. Match data 720 may be stored in memory 710 of match engine 700.

Processor 705 may generate a match indicator 735 to indicate a match event between the WHUD and the communicant device based on match data 720. The determination of whether there is a match event between the WHUD and the communicant device may be made by processor 705 in a manner similar to the corresponding determinations of match events described herein in relation to FIGS. 1-6. Moreover, match indicator 735 may be similar to the corresponding match indicators described herein in relation to FIGS. 1-6.

Processor 705 may then send match indicator 730 to the WHUD. In some examples, processor 705 may control communication terminal 715 to send match indicator 735 to the WHUD. In FIG. 7, communication terminal 715 is shown in dashed lines to indicate that in some examples match engine 700 need not include communication terminal 715. In such examples where match engine 700 does not include a communication terminal, match engine 700 or processor 705 may be in communication with a communication terminal external to match engine 700, and may use this external communication terminal to send match indicator 735 to the WHUD.

It is also contemplated that in some examples, match engine 700 need not be a component separate from the WHUD or its associated mobile device. As such, in some examples, match engine 700 may be incorporated into or implemented as a part of the WHUD. For example, match engine 700 may be incorporated into or implemented by controller 230 of system 200 shown in FIG. 2. Moreover, in some examples, match engine 700 may be incorporated into or implemented as a part of the mobile device associated with the WHUD.

As discussed above, method 100 and the other methods described herein may be performed by the display systems and WHUDs described herein such as system 200 and WHUDs 300, 405, and 410. Moreover, method 100 and the other methods described herein may also be performed by systems other than those described herein. Furthermore, system 200, WHUD 300, and the other systems and WHUDs described herein may have the features and perform the functions described herein in relation to method 100 and the other methods described herein. It is also contemplated that system 200, WHUD 300, and the other systems and WHUDs described herein may perform methods other than methods described herein.

According to an implementation of the present specification there is provided a method including: receiving an incoming ID at a first wearable heads-up display (WHUD), the incoming ID associated with a communicant device; sending match data from the first WHUD to a match engine, the match data including a first WHUD ID and the incoming ID, wherein the first WHUD ID is associated with the first WHUD; receiving a match indicator at the first WHUD from the match engine, the match indicator to indicate a match event between the first WHUD and the communicant device based on the match data; and effecting communication between the first WHUD and the communicant device including at least one of sending a message from the first WHUD to the communicant device and receiving at the first WHUD a corresponding message from the communicant device. The communicant device may include a second WHUD and the incoming ID may include a second WHUD ID associated with the second WHUD; and the receiving the incoming ID at the first WHUD may include receiving the second WHUD ID at the first WHUD.

The receiving the incoming ID may include receiving an optical transmission from the communicant device, the optical transmission including the incoming ID. The optical transmission may include an infrared (IR) transmission; and the receiving the incoming ID may include receiving the IR transmission from the communicant device. The optical transmission may include pulsed binary-coded bursts; and the receiving the incoming ID may include receiving the pulsed binary-coded bursts from the communicant device. The method may further include: sending the first WHUD ID from the first WHUD to the communicant device. The sending the first WHUD ID to the communicant device may include sending an optical transmission from the first WHUD to the communicant device, the optical transmission including the first WHUD ID. The optical transmission may include an IR transmission; and the sending the first WHUD ID to the communicant device may include sending the IR transmission from the first WHUD to the communicant device.

The optical transmission may include pulsed binary-coded bursts; and the sending the first WHUD ID to the communicant device may include sending the pulsed binary-coded bursts from the first WHUD to the communicant device. The match data may further include a timestamp to indicate a time of receipt of the incoming ID by the first WHUD; and the sending the match data from the first WHUD to the match engine may include sending the timestamp from the first WHUD to the match engine. The match data may further include location data of at least one of the communicant device and the first WHUD; and the sending the match data from the first WHUD to the match engine may include sending the location data from the first WHUD to the match engine. The communicant device may include a base station and the incoming ID may include a base station ID associated with the base station; and the receiving the incoming ID at the first WHUD may include receiving the base station ID at the first WHUD.

The receiving the base station ID at the first WHUD may include receiving, at the first WHUD, at least one of an optical transmission including the base station ID and a Bluetooth™ transmission including the base station ID. The sending the match data from the first WHUD to the match engine may include sending the match data wirelessly to at least one of: the match engine; and a mobile device, the mobile device to send the match data to the match engine. The sending the match data wirelessly may include sending the match data using a wireless data network. The sending the match data wirelessly using the wireless data network may include sending the match data using at least one of: a cellular network, a WiFi network, a LAN, and an LTE network. The match event may include providing an authorization for communication between the first WHUD and the communicant device based on the match data.

The method may further include: receiving a communication request from the communicant device at the first WHUD; sending the communication request from the first WHUD to the match engine; wherein: the receiving the match indicator at the first WHUD from the match engine may include receiving the match indicator at the first WHUD from the match engine to indicate the match event between the first WHUD and the communicant device based on the match data and the communication request; and the effecting the communication between the first WHUD and the communicant device may include receiving at the first WHUD the corresponding message from the communicant device, the corresponding message associated with the communication request. The receiving the incoming ID at the first WHUD may include receiving outgoing communications from the communicant device at the first WHUD for a minimum time duration, the outgoing communications including the incoming ID. The method may further include: prior to the sending the match data to the match engine, receiving at the first WHUD a user input to send the match data to the match engine, the user input from a user of the first WHUD.

The method may further include: prior to the effecting the communication between the first WHUD and the communicant device, receiving at the first WHUD a user input to effect the communication between the first WHUD and the communicant device, the user input from a user of the first WHUD. According to another implementation of the present specification there is provided a wearable heads-up display (WHUD) including: a light source to generate an output light; a spatial modulator to receive the output light from the light source and spatially modulate the output light; a display optic to receive the output light from the spatial modulator and direct the output light towards an eye of a user of the WHUD; a communication module; and a controller in communication with the light source, the spatial modulator, and the communication module, the controller to: receive an incoming ID associated with a communicant device, the incoming ID received from the communicant device at the communication module; control the communication module to send match data to a match engine, the match data including a WHUD ID and the incoming ID, the WHUD ID associated with the WHUD; receive a match indicator from the match engine, the match indicator to indicate a match event between the WHUD and the communicant device based on the match data; and effect communication between the WHUD and the communicant device, to effect the communication the controller to at least one of: control the communication module to send a message to the communicant device and receive a corresponding message from the communicant device.

The controller may be further to control the light source and the spatial modulator to display to the user at least one of the message and the corresponding message. The communicant device may include a second WHUD, and the incoming ID may include a second WHUD ID associated with the second WHUD. The communication module may include an optical receiver; and the optical receiver may be to receive an optical transmission from the communicant device, the optical transmission including the incoming ID. The optical transmission may include an infrared (IR) transmission. The optical transmission may include pulsed binary-coded bursts. The optical receiver may include an avalanche photodiode and a transimpedance amplifier. The optical receiver may further include a bandpass filter. The optical receiver may include a PIN diode and a transimpedance amplifier. The optical receiver may include a camera.

The controller may be further to: control the communication module to send the WHUD ID to the communicant device. The communication module may include an optical transmitter; and to send the WHUD ID to the communicant device the controller may be to control the optical transmitter to send an optical transmission to the communicant device, the optical transmission including the WHUD ID. The optical transmission may include an infrared (IR) transmission. The optical transmission may include pulsed binary-coded bursts. The optical transmitter may include a vertical cavity surface emitting laser (VCSEL). The match data may further include a timestamp to indicate a time of receipt of the incoming ID by the WHUD. The match data may further include location data of at least one of the communicant device and the WHUD.

The communicant device may include a base station to transmit the incoming ID; and the incoming ID may include a base station ID associated with the base station. The communication module may include one or more of an optical receiver and a Bluetooth™ receiver; and to receive the base station ID from the base station the controller may be to receive from the base station at least one of an optical transmission including the base station ID and a Bluetooth™ transmission including the base station ID. To send the match data from the WHUD to the match engine the controller may be to control the communication module to send the match data wirelessly to at least one of: the match engine; and a mobile device, the mobile device to send the match data to the match engine. To send the match data wirelessly the controller may be to control the communication module to send the match data using a wireless data network. The wireless data network may include at least one of: a cellular network, a WiFi network, a LAN, and an LTE network. The match event may include providing an authorization for communication between the WHUD and the communicant device based on the match data. The controller may be further to: receive a communication request from the communicant device; control the communication module to send the communication request to the match engine; wherein: to receive the match indicator at the WHUD from the match engine the controller may be to receive the match indicator at the WHUD from the match engine to indicate the match event between the WHUD and the communicant device based on the match data and the communication request; and to effect the communication between the WHUD and the communicant device the controller may be to receive the corresponding message from the communicant device, the corresponding message associated with the communication request.

To receive the incoming ID the controller may be to receive outgoing communications from the communicant device for a minimum time duration, the outgoing communications including the incoming ID. The controller may be further to: prior to controlling the communication module to send the match data to the match engine, receive a user input to send the match data to the match engine, the user input from the user of the WHUD. The controller may be further to: prior to effecting the communication between the first WHUD and the communicant device, receive a user input to effect the communication between the WHUD and the communicant device, the user input from the user of the first WHUD. According to yet another implementation of the present specification there is provided a method including: receiving match data at a match engine, the match data including a wearable heads-up display (WHUD) ID associated with a WHUD and an incoming ID associated with a communicant device; generating a match indicator to indicate a match event between the WHUD and the communicant device based on the match data; and sending the match indicator to the WHUD. The method may further include: sending the match indicator to the communicant device. The method may further include: routing a message between the WHUD and the communicant device. The match data may include location data of one or more of the communicant device and the WHUD; the receiving the match data at the match engine may include receiving the location data at the match engine; and the generating the match indicator may include generating the match indicator based on locations of the WHUD and the communicant device relative to one another.

The match data may include at least one timestamp associated with at least one of the WHUD ID and the incoming ID; and the receiving the match data at the match engine may include receiving the at least one timestamp at the match engine. The match data may include a first timestamp associated with the WHUD ID and a second timestamp associated with the incoming ID; and the generating the match indicator may include generating the match indicator based on the first timestamp and the second timestamp relative to one another.

Throughout this specification and the appended claims, infinitive verb forms are often used. Examples include, without limitation: "to send," "to receive," "to effect," "to transmit," and the like. Unless the specific context requires otherwise, such infinitive verb forms are used in an open, inclusive sense, that is as "to, at least, send," to, at least, receive," "to, at least, effect," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method comprising:
sending match data from a first wearable heads-up display (WHUD) to a match engine, the match data comprising a first WHUD identifier (ID) and an incoming ID associated with a communicant device, wherein the first WHUD ID is associated with the first WHUD;
receiving a match indicator at the first WHUD from the match engine, the match indicator to indicate a match event between the first WHUD and the communicant device based on the match data; and
based on the match event, effecting communication between the first WHUD and the communicant device.

2. The method of claim 1 wherein:
the communicant device comprises a second WHUD and the incoming ID comprises a second WHUD ID associated with the second WHUD; and
wherein the match event is based on a whether the second WHUD ID is on a black list or a white list and whether the first WHUD is in a public mode or a private mode.

3. The method of claim 1, further comprising receiving the incoming ID from the communicant device, wherein the receiving the incoming ID comprises receiving an optical transmission from the communicant device, the optical transmission comprising the incoming ID.

4. The method of claim 3, wherein:
the optical transmission comprises an infrared (IR) transmission.

5. The method of claim 3, wherein:
the optical transmission comprises pulsed binary-coded bursts.

6. The method of claim 1, wherein:
the match data further comprises a timestamp to indicate a time of receipt of the incoming ID by the first WHUD.

7. The method of claim 1, wherein:
the match data further comprises location data of at least one of the communicant device and the first WHUD.

8. The method of claim 1, wherein:
the communicant device comprises a base station and the incoming ID comprises a base station ID associated with the base station.

9. The method of claim 8, further comprising receiving the base station ID at the first WHUD via at least one of an optical transmission comprising the base station ID and a Bluetooth™ transmission comprising the base station ID.

10. The method of claim 1, wherein the sending the match data from the first WHUD to the match engine comprises sending the match data wirelessly to a mobile device, the mobile device to send the match data to the match engine.

11. The method of claim 1, wherein the match event comprises an authorization for communication between the first WHUD and the communicant device based on the match data.

12. A wearable heads-up display (WHUD) comprising:
a communication module; and
a controller to:
control the communication module to send match data to a match engine, the match data comprising a WHUD identifier (ID) and an incoming ID associated with a communicant device, the WHUD ID associated with the WHUD;
receive a match indicator from the match engine, the match indicator to indicate a match event between the WHUD and the communicant device based on the match data; and
effect communication based on the match event between the WHUD and the communicant device.

13. The WHUD of claim 12, wherein the communicant device comprises a second WHUD, and the incoming ID comprises a second WHUD ID associated with the second WHUD.

14. The WHUD of claim 12, wherein:
the communication module comprises an optical receiver to receive an optical transmission from the communicant device, the optical transmission comprising the incoming ID.

15. The WHUD of claim 14, wherein the optical transmission comprises an infrared (IR) transmission.

16. The WHUD of claim 14, wherein the optical transmission comprises pulsed binary-coded bursts.

17. The WHUD of claim 14, wherein the optical receiver comprises an avalanche photodiode and a transimpedance amplifier.

18. The WHUD of claim 14, wherein the optical receiver comprises a PIN diode and a transimpedance amplifier.

19. The WHUD of claim 14, wherein the optical receiver comprises a camera.

20. A method comprising:
receiving match data at a match engine, the match data comprising a wearable heads-up display (WHUD) identifier (ID) associated with a WHUD and an incoming ID associated with a communicant device;
generating a match indicator to indicate a match event between the WHUD and the communicant device based on the match data; and
sending the match indicator to the WHUD.

* * * * *